(12) United States Patent
Ye

(10) Patent No.: US 9,491,095 B2
(45) Date of Patent: Nov. 8, 2016

(54) FAST REROUTE IN MULTI-PROTOCOL LABEL SWITCHING TRAFFIC ENGINEERING NETWORK

(71) Applicant: Hangzhou H3C Technologies Co., Ltd., Hangzhou (CN)

(72) Inventor: Jinrong Ye, Beijing (CN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 14/440,309

(22) PCT Filed: Nov. 11, 2013

(86) PCT No.: PCT/CN2013/086830
§ 371 (c)(1),
(2) Date: May 1, 2015

(87) PCT Pub. No.: WO2014/075590
PCT Pub. Date: May 22, 2014

(65) Prior Publication Data
US 2015/0304214 A1    Oct. 22, 2015

(30) Foreign Application Priority Data
Nov. 13, 2012  (CN) .......................... 2012 1 0452709

(51) Int. Cl.
*H04L 12/58* (2006.01)
*H04L 12/723* (2013.01)
(Continued)

(52) U.S. Cl.
CPC ............. *H04L 45/507* (2013.01); *H04L 45/22* (2013.01); *H04L 12/437* (2013.01); *H04L 45/28* (2013.01); *H04L 45/50* (2013.01)

(58) Field of Classification Search
CPC ....... H04L 45/22; H04L 45/24; H04L 45/28; H04L 45/50; H04L 45/52; H04L 45/502; H04L 45/505; H04L 45/507; H04L 45/56; H04L 45/563
See application file for complete search history.

(56) References Cited

U.S. PATENT DOCUMENTS 6,339,595 B1 *   1/2002   Rekhter .............. H04L 12/4645
                                                          370/392
6,973,057 B1 *  12/2005   Forslow .................. H04L 45/50
                                                          370/328
(Continued)

FOREIGN PATENT DOCUMENTS

CN         101159681         4/2008
CN         101483491         7/2009
(Continued)

OTHER PUBLICATIONS

International Search Report and Written Opinion dated Feb. 27, 2014 issued on PCT Patent Application No. PCT/CN2013/086830 dated Nov. 11, 2013, The State Intellectual Property Office, P.R. China.

(Continued)

*Primary Examiner* — Kevin Mew
(74) *Attorney, Agent, or Firm* — Hewlett Packard Enterprise Patent Department

(57) ABSTRACT

In an example, multi-protocol label switching traffic engineering (MPLS TE) fast reroute (FRR) is implemented in an MPLS TE network. The MPLS TE network includes a bypass protection (BP)-label switching path (LSP) protecting a working LSP. A node receives a packet from an upstream adjacent node of the node in a working LSP. The packet includes a label which is an incoming label of the working LSP at the node. When detecting a downstream adjacent node of the node in the working LSP is unreachable, the node replaces the label in the packet with an outgoing label of a WP-LSP at the node, and forwards the packet in the WP-LSP which delivers the packet to an ingress node of a BP-LSP. The BP-LSP then delivers the packet to an egress node of the BP-LSP and the packet is forwarded from the BP-SLP to the working LSP.

13 Claims, 6 Drawing Sheets

(51) Int. Cl.
  *H04L 12/707*   (2013.01)
  *H04L 12/703*   (2013.01)
  *H04L 12/437*   (2006.01)

(56) References Cited

U.S. PATENT DOCUMENTS

| | | | |
|---|---|---|---|
| 6,985,963 B1* | 1/2006 | Johnson | H04L 12/2856 370/395.31 |
| 7,864,708 B1* | 1/2011 | Bryant | H04L 12/4633 370/238 |
| 2004/0240442 A1* | 12/2004 | Grimminger | H04L 45/00 370/389 |
| 2007/0019652 A1* | 1/2007 | Shand | H04L 45/02 370/395.21 |
| 2007/0038767 A1* | 2/2007 | Miles | H04L 45/22 709/230 |
| 2007/0070909 A1* | 3/2007 | Reeve | H04L 45/00 370/238 |
| 2007/0133406 A1* | 6/2007 | Vasseur | H04L 45/02 370/230 |
| 2008/0084881 A1* | 4/2008 | Dharwadkar | H04L 12/4641 370/392 |
| 2008/0304485 A1* | 12/2008 | Sinha | H04L 12/66 370/392 |
| 2009/0080326 A1 | 3/2009 | Xu | |
| 2010/0124231 A1* | 5/2010 | Kompella | H04L 45/04 370/401 |
| 2011/0063973 A1* | 3/2011 | VenkataRaman | H04L 12/1877 370/228 |
| 2011/0305136 A1* | 12/2011 | Pan | H04L 41/0663 370/218 |
| 2013/0051250 A1* | 2/2013 | Shaffer | H04L 45/22 370/252 |
| 2014/0086253 A1* | 3/2014 | Yong | H04L 12/4633 370/395.53 |

FOREIGN PATENT DOCUMENTS

| | | |
|---|---|---|
| CN | 102315972 | 1/2012 |
| EP | 2224644 A1 | 9/2010 |

OTHER PUBLICATIONS

Extended European Search Report, EP Application No. 13855664.2, Date: May 18, 2016, pp. 1-10, European Patent Office.

Y. Weingarten et al., "Applicability of MPLS-TP Linear Protection for Ring Topologies," Sep. 1, 2011, pp. 1-28, Network Working Group, Internet-Draft, IETF Trust.

\* cited by examiner

| object length | object type | C-Type |
|---|---|---|
| label value | | |
Fig. 3
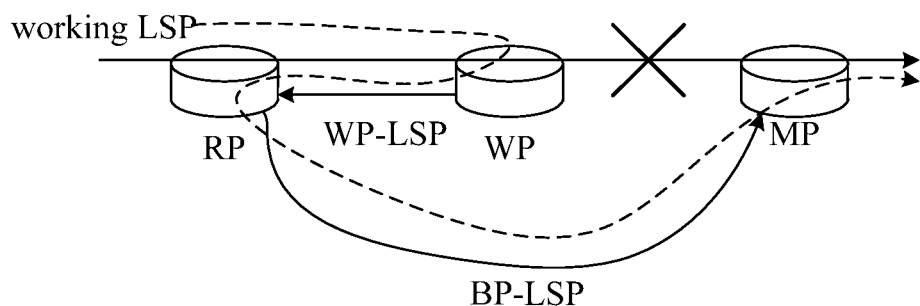
Fig. 4a
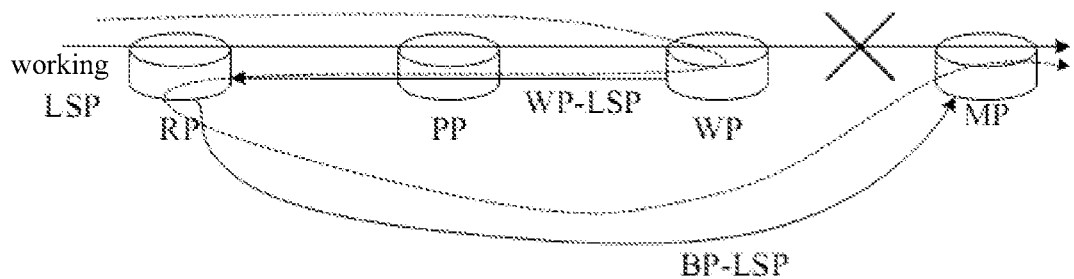
Fig. 4b
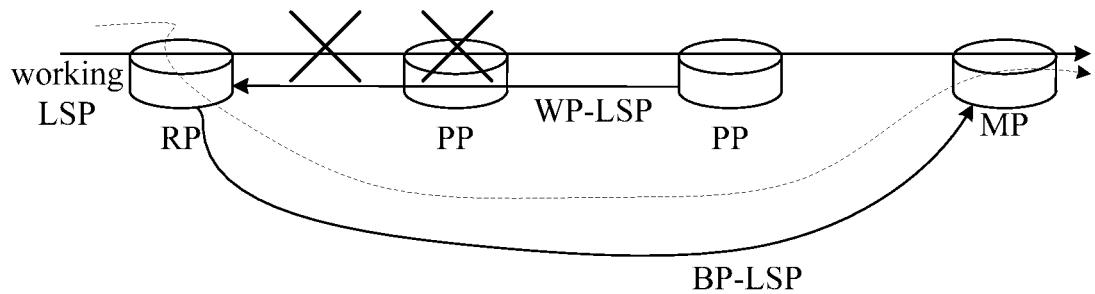
Fig. 4c

| ILM | |
|---|---|
| iL | WP-iL-Work |
| oL | WP-oL-Work | Swap |
| pL | WP-oL-Wrapping | Swap |

Fig. 5a

| ILM | |
|---|---|
| iL | WP-iL-Wrapping |
| oL | WP-oL-Wrapping | Swap |

Fig. 5b

| FTN | | | |
|---|---|---|---|
| FEC | | fec-Work | |
| oL | | RP-oL-Work | Push |
| pL | Inner | MP-iL-Work | Push |
| | outer | RP-oL-Bypass | Push |

Fig. 6a

| ILM | | | |
|---|---|---|---|
| iL | RP-iL-Work | | |
| oL | | RP-oL-Work | Swap |
| pL | inner | MP-iL-Work | Swap |
| | outer | RP-oL-Bypass | Push |

Fig.6b

| ILM | | | |
|---|---|---|---|
| iL | RP-iL-Wrapping | | |
| oL | inner | MP-iL-Work | Swap |
| | outer | RP-oL-Bypass | Push |

Fig.6c

| ILM | | |
|---|---|---|
| iL | MP-iL-Work | |
| oL | Empty | Pop |

Fig. 7a

| ILM | |
|---|---|
| iL | MP-iL-Work |
| oL | MP-oL-Work | Swap |

| ILM | |
|---|---|
| iL | MP-iL-Bypass |
| oL | Empty | Pop |

FAST REROUTE IN MULTI-PROTOCOL LABEL SWITCHING TRAFFIC ENGINEERING NETWORK

CLAIM FOR PRIORITY

The present application is a national stage filing under 35 U.S.C 371 of PCT application number PCT/CN2013/086830, having an international filing date of Nov. 11, 2013, which claims priority to Chinese patent application number 201210452709.6 having a filing date of Nov. 13, 2012 the disclosures of which are hereby incorporated by reference in their entireties.

BACKGROUND

The fast reroute (FRR) mechanism is generally deployed in MPLS (Multi-Protocol Label Switching) TE (Traffic Engineering) networks to implement switching of LSPs (Label Switched Paths) in case of a node failure or link failure or the like so as to reduce the traffic interruption time. For FRR, an LSP passing through a node has a backup LSP originating at a node upstream, so if the LSP fails, the backup LSP from the upstream node is available. The nodes in an MPLS TE network may be LSRs (Label Switching Routers).

BRIEF DESCRIPTION OF THE DRAWINGS

Features of the present disclosure are illustrated by way of example and not limited in the following figure(s), in which like numerals indicate like elements, in which:

FIG. 3 is a schematic diagram illustrating a wrapping label used in the working LSP and the co-path wrapping protection LSP as shown in FIG. 2a and FIG. 2b according to an example of the present disclosure;

FIG. 4a, FIG. 4b and FIG. 4c are schematic diagrams illustrating an MPLS TE fast reroute mechanism in the LSP deployment as shown in FIG. 1 according to an example of the present disclosure;

FIG. 5a and FIG. 5b are schematic diagrams illustrating a forwarding entry configured in a wrapping node in the LSP deployment as shown in FIG. 1 according to an example of the present disclosure;

FIG. 6a, FIG. 6b and FIG. 6c are schematic diagrams illustrating a forwarding entry configured in a reroute node in the LSP deployment as shown in FIG. 1 according to an example of the present disclosure;

FIG. 7a, FIG. 7b and FIG. 7c are schematic diagrams illustrating forwarding entries configured in merge nodes in the LSP deployment as shown in FIG. 1 according to an example of the present disclosure;

FIG. 8a and FIG. 8b are schematic diagrams illustrating an MPLS TE fast reroute mechanism according to an example of the present disclosure.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on.

According to examples described herein, a bypass protection LSP (BP-LSP) is configured in an MPLS TE network for an LSP. The BP-LSP can bypass a failed intermediate node or failed intermediate link of an LSP. Nodes in the MPLS TE may be LSRs. Also, the BP-LSP can minimize traffic disruption that may be caused by a node being unaware that a non-adjacent, downstream node or link failed in the working LSP. For example, a conventional MPLS TE fast re-route scheme may include a working LSP traversing RouterA, RouterB and RouterC in sequence. A protection LSP between RouterA and RouterC may be setup which does not traverse RouterB and has the same direction with the working LSP to protect RouterB. When a node failure occurs in RouterB or a link failure occurs in the link between RouterB and an upstream adjacent node of RouterB, RouterA may detect its downstream adjacent node in the working LSP, i.e., RouterB, is unreachable, and switches a packet flow which was supposed to be forwarded to RouterB onto the protection LSP to bypass the unreachable node RouterB in the working LSP. When a link failure occurs in the link between RouterB and its downlink adjacent node RouterC, RouterA cannot perceive whether RouterC is reachable because RouterA is not adjacent to RouterC. Therefore, RouterA may still forward the packet flow on the working LSP to RouterB which results in interruption of the packet flow between RouterB and RouterC. Examples of the present disclosure provide different schemes of deploying LSPs in an MPLS TE network that utilizes BP-LSPs. For example, referring to the example described above, a BP-SLP may be created that bypasses RouterB and thus avoids the problem of RouterA continuing to send traffic to RouterC through RouterB in the LSP when the downstream node or link that is not adjacent to RouterA in the LSP fails. Also, the switch to the BP-LSP may be prompted by the RouterB.

Figure 1:
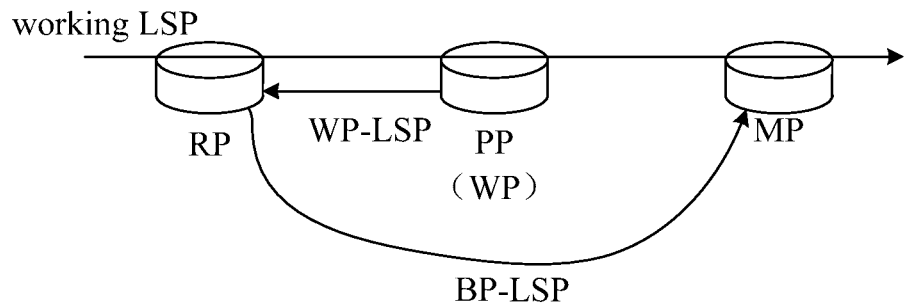
FIG. 1 is a schematic diagram illustrating deployment of LSPs according to an example of the present disclosure.

As shown in FIG. 1, a BP-LSP is configured in an MPLS TE network. There may be intermediate nodes between the ingress node and the egress node of BP-LSP. The intermediate nodes may perform forwarding according to existing LSP forwarding principles. The examples of the present disclosure described below mainly focus on the forwarding scheme for the ingress node and the egress node of a BP-LSP.

As shown in FIG. 1, a working LSP meeting the following requirements may be protected by a given BP-LSP: the working LSP and the BP-LSP have the same direction; and the working LSP only traverses the ingress node and the egress node of the BP-LSP but does not traverse intermediate nodes of the BP-LSP, i.e., the working LSP and the BP-LSP intersect only at the ingress node and the egress node of the BP-LSP. The working LSP protected by the BP-LSP may include intermediate nodes between the ingress node and the egress node of the BP-LSP.

In a working LSP protected by a BP-LSP, the node in the working LSP that also serves as the ingress node of the BP-LSP is referred to as a Reroute Point (RP); the node in the working LSP that also serves as the egress node of the BP-LSP is referred to as a Merge Point (MP); an intermediate node in the working LSP between the ingress node and the egress node is referred to as a protected point (PP). A PP in the working LSP protected by the BP-LSP can perceive a downlink failure, serve as a wrapping point (WP) to initiate a protection switch process when a downlink failure is perceived, and work with the RP and the MP to implement the protection switch according to a wrapping fast reroute (FRR) mechanism provided by various examples of the present disclosure.

Besides the RP and the MP which are intersection points of the working LSP and the BP-LSP, various examples also provide technical schemes for a PP in the working LSP between the RP and the MP. Nodes in the working LSP other than the PP, the RP and the MP may perform forwarding according to an existing LSP forwarding mechanism, and is not limited in the present disclosure.

Referring to FIG. 1, the working LSP protected by the BP-LSP may also have a dedicated wrapping protection LSP (WP-LSP) whose direction is opposite to the direction of the working LSP. The WP-LSP may traverse at least the RP and all PPs in the working LSP.

In an example, a BP-LSP may not only protect one working LSP but also protect multiple working LSPs, i.e., one BP-LSP may protect multiple working LSPs, and the multiple working LSPs all intersect with the BP-SP at the ingress node and the egress node of the BP-LSP. The BP-LSP may stand alone independent of a working LSP.

When a BP-LSP protects multiple working LSP, the multiple working LSP may have different paths between the ingress node and the egress node of the BP-LSP. Various examples of the present disclosure illustrates the mechanism by taking the protection switch process of a working LSP as an example.

In an example, a BP-LSP, a working LSP protected by the BP-LSP and a WP-LSP of the working LSP may all be uni-directional. In another example, the BP-LSP may be bi-directional, the working LSP and the WP-LSP may each include two uni-directional LSPs in both directions.

Alternatively, the BP-LSP may include two uni-directional LSPs in both directions, the working LSP and the WP-LSP may both be bi-directional LSPs. The protection mechanism of a BP-LSP in one direction is the same regardless of the number of BP-LSPs and the direction of the BP-LSP. Therefore, examples of the present disclosure take a BP-LSP in one direction as an example. The BP-LSP may be established individually through a process including route calculation, label distribution and route recording.

After path calculations, binding calculations of wrapping FRR are performed to decide whether a working LSP is to be protected by a BP-LSP, and a working/backup relation is formed between a BP-LSP and a working LSP protected by the BP-LSP. After it is determined the working LSP is capable of being protected by a BP-LSP, i.e., the working LSP may be configured to adopt a wrapping FRR protection mode, a label is distributed in the working LSP to inform each node in the working LSP that the working LSP is configured to adopt the wrapping FRR protection mode, and route records are generated.

In one example, the PP, the RP and the binding relation between the working LSP and the BP-LSP may only be determined after the wrapping FRR binding calculations are completed for the working LSP and the BP-LSP, and a WP-LSP may traverse the RP and all PPs in the working LSP. Therefore, when the WP-LSP does not traverse all nodes in the working LSP, the route calculation, label distribution and route recording for the WP-LSP may be started after the wrapping FRR binding calculations are completed for the working LSP and the BP-LSP. When a WP-LSP traverses all nodes in a working LSP, i.e., the ingress node of the WP-LSP is the egress node of the working LSP and the egress node of the WP-LSP is the ingress node of the working LSP, the route of the WP-LSP may be determined when the path calculations of the working LSP protected by the WP-LSP are completed, and labels are configured in each node in the working LSP and the WP-LSP during the label distribution process of the working LSP. When a WP-LSP traverses all nodes in a working LSP protected by the WP-LSP (simply referred to as the working LSP), an example provides a label distribution method which informs all nodes of the working LSP that the working LSP is configured to adopt a wrapping FRR protection mode during the label distributing process and configures labels in the nodes of the working LSP and in the nodes of the WP-LSP at the same time.

In an example, the label distribution process is implemented by using the resource reservation protocol-traffic engineering (RSVP-TE). The process includes a hop-by-hop delivery process of a Path message initiated by one end of a working LSP (the ingress node of a uni-directional LSP or an active end point of a bi-directional LSP) to the other end of the working LSP (the egress node of a uni-directional LSP or a passive end point of a bi-directional LSP) and a hop-by-hop delivery process of a response (Resv) message in the reversed direction initiated by the other end.

Figure 2A:
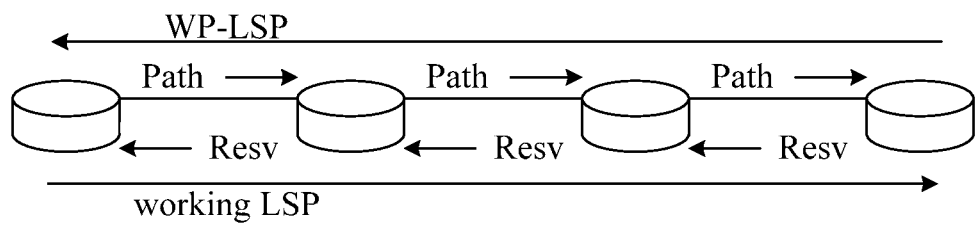
FIG. 2a and FIG. 2b are schematic diagrams illustrating a working LSP and a co-path wrapping LSP according to an example of the present disclosure.
Figure 2B:
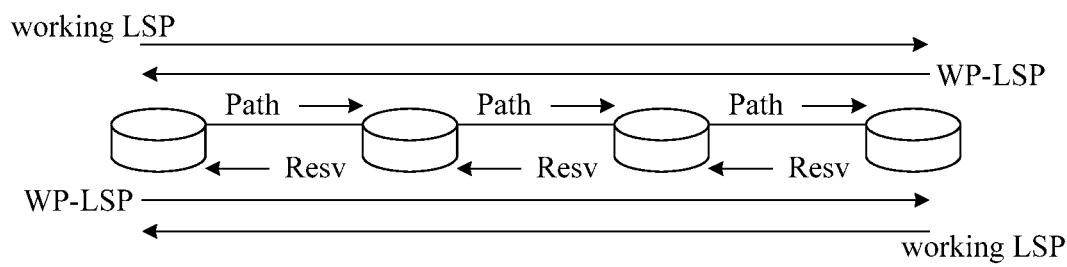

FIG. 2a is an example when a working LSP and corresponding WP-LSP are both uni-directional, and FIG. 2b is an example when a working LSP and corresponding WP-LSP are both bi-directional.

In an example, the label of the WP-LSP is also distributed during the label distribution process. FIG. 3 is a schematic diagram illustrating a wrapping protection label (denoted as RSVP_Wrapping_Protection_Label) according to an example. The wrapping protection label is used for specifying that the working LSP is configured to adopt a wrapping FRR protection mode. As shown in FIG. 3, an RSVP_Wrapping_Protection_Label may include: an object length field, an object type field, a code type (C-Type) field and a label value field. When a working LSP and corresponding WP-LSP are both uni-directional, a Path message may include an RSVP_Wrapping_Protection_Label for each working LSP protected by a BP-LSP (simply referred to as a/the working LSP in the following). In an RSVP_Wrapping_Protection_Label in a Path message, the label value field includes a label value used in a WP-LSP by nodes of a working LSP that is applying for a label. A Resv message may include a regular working label. The working label may include a label value of the working LSP that is currently requesting a label. When a working LSP and corresponding WP-LSP are both bi-directional, a Path message and a Resv message may include a regular working label and an RSVP_Wrapping_Protection_Label for both directions of each working LSP protected by a BP-LSP.

In a Path message, an RSVP_Wrapping_Protection_Label has a label value field with a label value of a WP-LSP in the direction in which the Resv message is forwarded, and the working label includes a label value of the working LSP in the direction in which the Path message is forwarded. In a Resv message, an RSVP_Wrapping_Protection_Label includes a label value field with a label value of a WP-LSP in the direction in which the Path message is forwarded, and the working label includes a label value of the working LSP in the direction in which the Resv message is forwarded. In an example, a BP-LSP, a working LSP, a WP-LSP may also be configured statically.

The above is a detailed description of several examples of deploying LSPs. The following describes a basic principle of implementing MPLS TE FRR, i.e., the Wrapping FRR protection mode, taking the LSP deployment shown in FIG. 1 as an example.

As shown in FIG. 4a, when a link failure (failures in this disclosure are denoted by "x" in the drawings) occurs between a PP (the PP becomes a WP) and its downlink adjacent node (i.e., the MP) in FIG. 4a which makes the downlink adjacent node (i.e., the MP) of the PP in the working LSP become unreachable, although the link failure is out of the perceiving range of the RP, protection switch can still be implemented through cooperation of nodes between the RP and the MP by using the following method.

When the WP (i.e., the upstream node adjacent to the failure) receives a packet from the working LSP and detects the downstream adjacent node (e.g., the MP) of the WP in the working LSP is unreachable, the WP switches packets from the working LSP onto the WP-LSP of the working LSP (simply referred to as the WP-LSP in the following) and forwards the packets in the direction of the RP.

When the RP receives a packet from the WP-LSP, the RP switches the packets from the WP-LSP onto the BP-LSP, and forwards the packets in the direction of the MP.

When the MP receives a packet from the BP-LSP, the MP switches the packets from the BP-LSP back to the working LSP.

As such, since the PP between the RP and the MP in the working LSP has the ability of perceiving a failure and serving as a WP to direct a packet flow from the working LSP back to the RP when detecting the downlink adjacent node is unreachable, the RP then switches the packet flow from the working LSP onto the BP-LSP to the MP which then switches the packet flow back to the working LSP as long as the RP and the MP are not failed. Therefore, this example implements protection switch even when the failure is out of the perceiving range of the RP and reduces traffic interruption time.

Examples of the present disclosure do not rely on the perceiving range of the RP, therefore, the number of PPs between the RP and the MP in the working LSP traversed by the WP-LSP may be more than one. In this case, PPs other than the PP serving as the WP also forward packets in the WP-LSP.

FIG. 4b shows two PPs. When a failure occurs in a link between the MP and a downlink PP of RP (which serves as the WP) and makes the downlink adjacent node of the WP in the working LSP (i.e., the MP) become unreachable, although the link failure is out of the perceiving range of the RP, protection switch can still be implemented through cooperation of nodes between the RP and the MP by using the following method.

When the WP receives a packet from the working LSP and detects the downstream adjacent node (e.g., the MP) of the WP in the working LSP is unreachable, the WP switches packets from the working LSP onto the WP-LSP of the working LSP and forwards the packets in the direction of the RP.

When the PP located at the upstream of the WP receives a packet (the packet is from a downlink PP serving as WP) from the WP-LSP, the PP forwards the packet in the WP-LSP towards the RP.

When the RP receives a packet from the WP-LSP, the RP switches the packet onto the BP-LSP, and forwards the packet towards the MP.

When the MP receives a packet from the BP-LSP, the MP switches the packet back to the working LSP.

When a node failure occurs at the downlink PP or a link failure occurs in a link between the two PPs and the failure makes the downlink adjacent node of the upstream PP in the working LSP unreachable, the upstream PP may serve as the WP, and implement protection switch together with the RP and the MP by using the method as shown in FIG. 4a and FIG. 4b.

Various examples of the present disclosure can be implemented without relying on the perceiving range of the RP, and the number of PPs between the RP and the MP on the working LSP that are traversed by the WP-LSP may be more than one, thus a BP-LSP can protect multiple nodes on the working LSP.

When a failure occurs within the perceiving range of the RP, e.g., a node failure occurred at the upstream PP in the two PPs as shown in FIG. 4c or a link failure occurred between the RP and the upstream PP which makes the downlink adjacent node of the RP in the working LSP (i.e., the upstream PP) become unreachable, the node failure or the link failure can be perceived by the RP. Then, the RP and the MP may implement protection switch by using the following method.

When the RP receives a packet from the working LSP and detects the downstream adjacent node of the RP in the working LSP is unreachable, the RP switches packets in the working LSP onto the BP-LSP and forwards the packets in the direction of the MP.

When the MP receives a packet from the BP-LSP, the MP switches the packets from the BP-LSP back to the working LSP.

Therefore, various examples of the present disclosure are able to trigger a protection switch process to reduce the traffic interruption time no matter whether the failure is within or out of the perceiving range of the RP as long as the RP and the MP do not suffer from a node failure.

In an example, the RP and the PP may detect a failure according to a conventional Operation, Administration and Maintenance (OAM) connectivity detection mechanism. Other applicable methods may also be used.

In an example, when detecting its downlink adjacent node in the working LSP is unreachable, the PP or the RP may initiate a wrapping FRR protection instruction to the ingress node of the working LSP over a control plane to trigger the ingress node of the working LSP to re-calculate a route for the working LSP and tear down the working LSP and the WP-LSP of the working LSP after the re-calculation is completed.

An example also makes modifications to forwarding entries configured in the PP, the RP and the MP so as to implement the protection switch mechanism as shown in FIGS. 4a, 4b and 4c while making the working LSP forward packets normally. The following describes several examples of forwarding entries in the PP, the RP and the MP respectively.

An incoming label map (ILM) forwarding entry as shown in FIG. 5a is configured in a PP for a working LSP. If the PP has downlink PPs in the working LSP, an ILM forwarding entry as shown in FIG. 5b is also configured for the WP-LSP of the working LSP. The ILM forwarding entry as shown in FIG. 5a may include the following items: an incoming label (iL), serving as an index of the forwarding entry, having a label value of an incoming label value of the working LSP at the node which is denoted as WP-iL-Work in this example; an outgoing label (oL), used when the downlink adjacent node of the node in the working LSP is reachable, having a label value of an outgoing label value of the working LSP at the node which is denoted as WP-oL-Work, and the operation type corresponding to the oL is set to be one swap; and a protection label (pL), used when the downlink adjacent node of the node in the working LSP is unreachable, having a label value of an outgoing label value of the WP-LSP at the node which is denoted as WP-oL-Wrapping, and the operation type corresponding to the pL is set to be one swap.

The ILM forwarding entry as shown in FIG. 5b may include the following items: an incoming label (iL), serving as an index of the forwarding entry, having a label value of an incoming label value of the node for the WP-LSP which is denoted as WP-iL-Wrapping in this example; and an outgoing label (oL), having a label value of an outgoing label value of the WP-LSP at the node which is denoted as WP-oL-Wrapping, and the operation type corresponding to the oL is set to be one swap.

When the RP is the ingress node of the working LSP, a forwarding equivalent class (FEC) to nexthop label forwarding entry (NHLFE) map (FEC to NHLFE map, FTN) forwarding entry as shown in FIG. 6a may be configured in the RP for the working LSP protected by the BP-LSP, and an ILM forwarding entry as shown in FIG. 6c may be configured in the RP for the WP-LSP of the working LSP. When the RP is an intermediate node in the working LSP protected by the BP-LSP, an ILM forwarding entry as shown in FIG. 6b may be configured in the RP for the working LSP, and an ILM forwarding entry as shown in FIG. 6c may be configured in the RP for the WP-LSP.

An FTN forwarding entry as shown in FIG. 6a may include:
an FEC, serving as an index of the forwarding entry, having a value of a forwarding equivalence class of the working LSP at the node which is denoted as fec-Work;
an outgoing label (oL), used when the downlink adjacent node of the node in the working LSP is reachable, having a label value of an outgoing label value of the working LSP at the node which is denoted as RP-oL-Work, and the operation type corresponding to the oL is set to be one push (Push); and
a protection label (pL), used when the downlink adjacent node of the node in the working LSP is unreachable, an inner layer of the pL having a label value of an incoming label value of the working LSP at the MP which is denoted as MP-iL-Work, an outer layer of the pL having a label value of an outgoing label value of the BP-LSP at the node which is denoted as RP-oL-Bypass, having configurations indicating two push for the inner layer and the outer layer respectively.

An ILM forwarding entry as shown in FIG. 6b may include:
an incoming label (iL), serving as an index of the forwarding entry, having a label value of an incoming label value of the working LSP at the node which is denoted as RP-iL-Work;
an outgoing label (oL), used when the downlink adjacent node of the node in the working LSP is reachable, having a label value of an outgoing label value of the working LSP at the node which is denoted as RP-oL-Work, and the operation type corresponding to the oL is set to be one swap; and
a protection label (pL), used when the downlink adjacent node of the node in the working LSP is unreachable, an inner layer of the pL having a label value of an incoming label value of the working LSP at the MP which is denoted as MP-iL-Work, an outer layer of the pL having a label value of an outgoing label value of the BP-LSP at the node which is denoted as RP-oL-Bypass, having configurations indicating one swap for the inner layer and one push for the outer layer.

An ILM forwarding entry as shown in FIG. 6c may include:
an incoming label (iL), serving as an index of the forwarding entry, having a label value of an incoming label value of the WP-LSP at the node which is denoted as RP-iL-Wrapping; and
an outgoing label, an inner layer of the oL having a label value of an incoming label value of the working LSP at the MP which is denoted as MP-iL-Work, an outer layer of the oL having a label value of an outgoing label value of the BP-LSP at the node which is denoted as RP-oL-Bypass, and an operation type of the oL is set as one swap for the inner layer and one push for the outer layer.

Figures 7B, 7C, 8A:
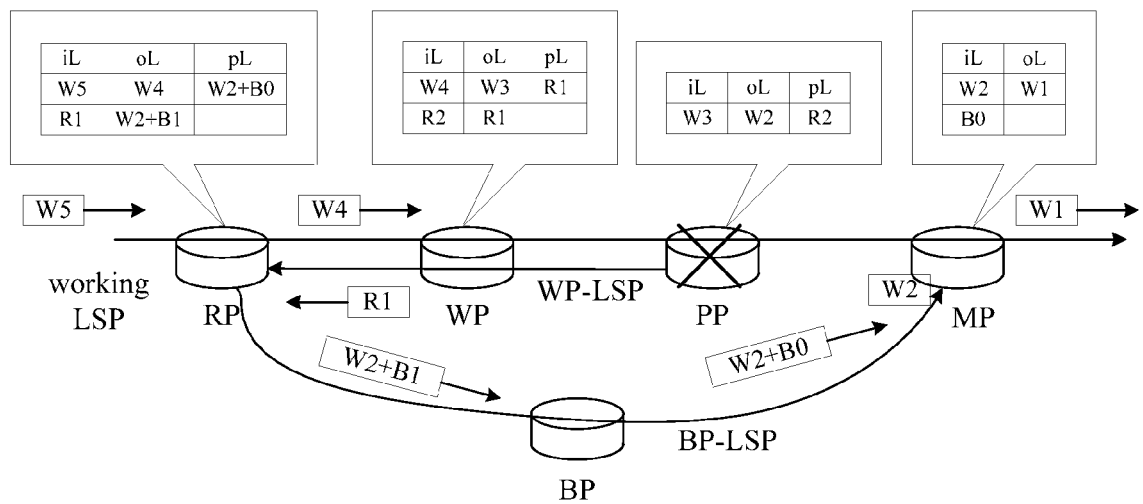

When the MP is an egress node in the working LSP protected by the BP-LSP, an ILM forwarding entry as shown in FIG. 7a may be configured in the MP for the working LSP, and an ILM forwarding entry as shown in FIG. 7c may be configured in the MP for the BP-LSP. When the MP is an intermediate node in the working LSP protected by the BP-LSP, an ILM forwarding entry as shown in FIG. 7b may be configured in the MP for the working LSP, and an ILM forwarding entry as shown in FIG. 7c may be configured in the MP for the BP-LSP.

An ILM forwarding entry as shown in FIG. 7a may include:
an incoming label (iL), serving as an index of the forwarding entry, having a label value of an incoming label value of the working LSP at the node which is denoted as MP-iL-Work; and
an outgoing label (oL), set as empty, and an operation type of the oL is set as one pop.

An ILM forwarding entry as shown in FIG. 7b may include:
an incoming label (iL), serving as an index of the forwarding entry, having a label value of an incoming label value of the working LSP at the node which is denoted as MP-iL-Work; and
an outgoing label (oL), having a value of an outgoing label value of the working LSP at the node which is denoted as MP-oL-Work, and the operation type corresponding to the oL is set to be one swap.

An ILM forwarding entry as shown in FIG. 7c may include:
an incoming label (iL), serving as an index of the forwarding entry, having a label value of an incoming label value of the BP-LSP at the node which is denoted as MP-iL-Bypass; and
an outgoing label (oL), having a label value of an outgoing label value of the working LSP at the node which is denoted as MP-oL-Work, and the operation type corresponding to the oL is set to be one swap of the outer layer.

After receiving a packet from the BP-LSP, the MP may first remove the label in the outer layer of the packet (i.e., the incoming label value of the BP-LSP at the node) by using the ILM forwarding entry as shown in FIG. 7c, then forward the packet by using the ILM forwarding entry as shown in FIG. 7a or 7b according to the label in the inner layer of the packet (i.e., the incoming label value of the working LSP at the node). After the label in the outer layer of the packet is removed, the packet is regarded as received from the working LSP as long as the label in the inner layer is the incoming label value of the working LSP at the node.

In an example, a protection flag F may be set in the ILM entry as shown in FIG. 5a, the FTN entry as shown in FIG.

6a and the ILM entry as shown in FIG. 6b. The protection flag F is used for switching between the outgoing label oL and the protection label pL.

For example, the protection flag is set as invalid when the downlink adjacent node of the node in the working LSP is reachable so as to enable the outgoing label oL and disable the protection label pL; and the protection flag is set as valid when the downlink adjacent node of the node in the working LSP is unreachable so as to enable the protection label pL and disable the outgoing label oL.

The protection flag F may also be set in the ILM entries as shown in FIG. 5b, FIG. 6c, and FIG. 7a to FIG. 7c, and may be kept as invalid.

Figure 8B:
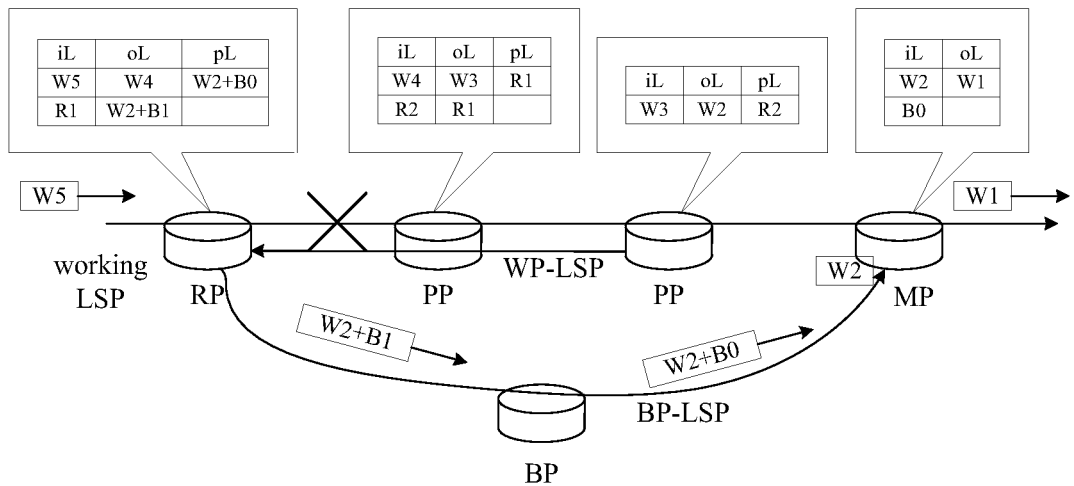

Configurations of the above forwarding entries are described with reference to the examples as shown in FIG. 8a and FIG. 8b.

In the examples as shown in FIG. 8a and FIG. 8b, the working LSP has two PPs between the RP and the MP, and the RP and the MP are both intermediate nodes of the working LSP.

In FIG. 8a, in the RP, an ILM forwarding entry as shown in FIG. 6b for the working LSP has an iL of W5, an oL of W4, and a pL of W2 (inner layer)+B0 (outer layer), and an ILM forwarding entry as shown in FIG. 6c for the WP-LSP has an iL of R1, an oL of W2 (inner layer)+B1 (outer layer);

in the PP adjacent to the RP (i.e., the WP), an ILM forwarding entry as shown in FIG. 5a for the working LSP has an iL of W4, an oL of W3, and a pL of R1, and an ILM forwarding entry as shown in FIG. 5b for the WP-LSP has an iL of R2, an oL of R1;

in the PP adjacent to the MP, an ILM forwarding entry as shown in FIG. 5a for the working LSP includes an iL of W3, an oL of W2 and a pL of R2, and there is not an ILM forwarding entry as shown in FIG. 5b for the WP-LSP in the PP because the PP does not have any downstream PP in the working LSP;

in the BP, an ILM forwarding entry which needs only one swap may be adopted to present an incoming label value B1 and an outgoing label value of B0 for the BP-LSP;

in the MP, an ILM forwarding entry as shown in FIG. 7b for the working LSP includes an iL of W2, an oL of W1; and an ILM forwarding entry as shown in FIG. 7c for the BP-LSP includes an iL of B0 and an oL of Empty.

As shown in FIG. 8a, when a node failure occurs in the PP adjacent to the MP and the PP adjacent to the RP (i.e., the WP) detects its downlink adjacent node is unreachable, although the failure is out of the perceiving range of the RP, the nodes between the RP and the MP in the working LSP may still cooperate with each other to implement protection switch according to the following method (e.g., steps a1-a6).

a1. The RP receives a packet with a label value of W5 from the working LSP, finds an ILM forwarding entry in which the iL is W5 and the oL is W4 by using the label value W5, replaces the label value W5 with W4 and forwards the packet in the working LSP towards the WP.

a2. The WP receives a packet with a label value of W4 from the working LSP, finds an ILM forwarding entry in which the iL is W4, the oL is W3 and the pL is R1 by using the label value W4, replaces the label value W3 in the packet with R1 instead of W3 because the WP detects its downlink adjacent node is unreachable, and forwards the packet with the label value R1 in the WP-LSP towards the RP in the reversed direction.

a3. The RP receives a packet with a label value of R1 from the WP-LSP, finds an ILM forwarding entry in which the iL is R1 and the oL is W2 (inner layer)+B1 (outer layer) by using the label value R1, replaces the label value in the packet with W2 (inner layer)+B1 (outer layer) and forwards the packet in the BP-LSP towards the MP.

a4. The BP receives the packet with label values of W2 (inner layer)+B1 (outer layer) from the BP-LSP, performs one swap to replace the outer label with B0, and forwards the packet with W2 (inner layer)+B0 (outer layer) in the BP-LSP towards the MP.

a5. The MP receives the packet with labels W2 (inner layer)+B0 (outer layer) from the BP-LSP, finds an ILM forwarding entry in which an iL is B0 and an oL is empty by using the outer layer label value B0 of the packet, pops out the outer layer label value B0 which makes the packet only have the inner layer label value W2.

a6. The MP finds an ILM forwarding entry in which an iL is W2 and an oL is W1 by using the inner layer label value W2 in the packet, replaces the label value W2 with W1, and forwards the packets in the working LSP towards the downstream.

When a link failure occurs between two PPs, the processing flow is similar with the process as shown in FIG. 8a. When a link failure occurs between the MP and its adjacent PP, the PP adjacent to the MP serves as the WP, and receives and transmits packets with the PP adjacent to the RP in the working LSP and the WP-LSP, and the other procedures are similar with those as shown in FIG. 10a.

As shown in FIG. 8b, when a link failure occurs between the RP and its adjacent PP or a node failure occurs in the PP adjacent to the RP which makes the downlink adjacent node of the RP in the working LSP (i.e., the PP adjacent to the RP) unreachable, the node failure or the link failure can be perceived by the RP, and the RP and the MP may cooperate with each other to implement protection switch according to the following method (e.g., steps b1-b3).

b1. The RP receives a packet with a label value of W5 from the working LSP, finds an ILM forwarding entry in which the iL is W5, the oL is W4 and the pL is W2 (inner layer)+B0 (outer layer) by using the label value W5, replaces the label value W5 in the packet with W2 (inner layer)+B0 (outer layer) instead of W4 because the RP detects its downlink adjacent node in the working LSP is unreachable, and forwards the packet with the label value W2 (inner layer)+B0 (outer layer) in the BP-LSP towards the MP. The processing in a BP is the same with that in the above example.

b2. The MP receives the packet with labels W2 (inner layer)+B0 (outer layer) from the BP-LSP, finds an iL in which an iL is B0 and an oL is empty by using the outer layer label value B0 of the packet, pops out the outer layer label value B0 which makes the packet only have the inner layer label value W2.

b3. The MP finds an ILM forwarding entry in which an iL is W2 and an oL is W1 by using the inner layer label value W2 in the packet, replaces the label value W2 with W1, and forwards the packets in the working LSP towards the downstream.

The above examples as shown in FIG. 8a and FIG. 8b take an RP and an MP which are both intermediate nodes of a working LSP as an example. When an RP is an ingress node of a working LSP and/or an MP is an egress node of the working LSP, the processing of the RP is different from that in the above examples only in that the RP may use an FEC to find a forwarding entry of the working LSP, and/or the processing of the MP is different from that in the above examples only in that the MP may pop the label out and use the FEC to identify the forwarding entry of the working LSP when forwarding the packet. The other processing may be the same with that in the above examples.

The above examples show two PPs between the RP and the MP as an example for the purposes of simplifying the description. When there are other PPs between the RP and the MP, those PPs may have similar label configurations and perform similar processing with that of the above PPs.

In addition, since each PP may serve as the WP, all PPs may have configurations similar to those in the above WP when deploying the LSPs.

The above described examples include examples of deploying LSPs. Various examples of the present disclosure provide methods for implementing MPLS TE FRR.

According to an example, a method for implementing MPLS TE FRR, which may be applied to an intermediate node (i.e., a PP) of a working LSP protected by a BP-LSP is now described. The PP is between an ingress node and an egress node of the BP-LSP. The method may include the following procedures.

The node (i.e., the intermediate node) receives a packet from an upstream adjacent node in the working LSP. The packet includes a label which is an incoming label of the working LSP at the node.

When detecting its downlink adjacent node in the working LSP is unreachable (which means the node becomes a WP), the node replaces the label in the packet with an outgoing label of the WP-LSP at the node, and forwards the packet in the WP-LSP so that the packet is forwarded through the WP-LSP to the ingress node of the BP-LSP (i.e., the RP) and then forwarded through the BP-LSP to the egress node of the BP-LSP (i.e., the MP) which forwards the packet to the working LSP.

When the node detects its downlink adjacent node is reachable (which means the node is still a PP), the node may replace the label in the packet with an outgoing label of the working LSP at the node and forward the packet in the working LSP according to a conventional method.

In an example, when there are at least two intermediate nodes (i.e., at least two PPs) in the working LSP which are between the ingress node and the egress node of the BP-LSP, the method may also include the following procedures.

The node (i.e., the intermediate node) receives a packet from an upstream adjacent node in the WP-LSP. The packet includes a label which is an incoming label of the WP-LSP at the node.

The node replaces a label in the packet with an outgoing label of the WP-LSP at the node and forwards the packet in the WP-LSP.

In an example, the method may include the following procedures to inform the ingress node of the working LSP that the node has carried out protection switch under the wrapping FRR mode.

When detecting its downlink adjacent node in the working LSP is unreachable (which means the node becomes a WP), the node initiates a notification of wrapping FRR mode FRR protection to the ingress node of the working LSP to make the ingress node re-calculates a path for the working LSP and tear down the working LSP and the WP-LSP after the re-calculation is finished.

In an example, a method for implementing MPLS TE FRR, which is applicable to an ingress node of a BP-LSP (i.e., an RP), may include the following procedures.

The node (i.e., the ingress node of the BP-LSP) receives a packet from an upstream adjacent node in the WP-LSP (i.e., the packet is from a WP). The packet includes a label which is an incoming label of the WP-LSP at the node.

The node forms a duo-layer label in the packet, sets the inner layer label as an incoming label of the working LSP at an egress node of the BP-LSP (i.e., the MP), sets the outer layer label as an outgoing label of the BP-LSP at the node, and forwards the packet in the BP-LSP which delivers the packet to the egress node of the BP-LSP so that the egress node of the BP-LSP forwards the packet in the working LSP.

In an example, a method of forming a duo-layer label in a packet may include: replacing the label in the packet with the incoming label of the working LSP at the egress node of the BP-LSP (i.e., the MP) which serves as the inner layer label, and pushing the outgoing label of the BP-LSP at the node into the packet as the outer layer label.

In an example, the method may also include the following procedures when applied to an RP.

The node receives a packet from an upstream adjacent node in the working LSP (i.e., the node serves as an intermediate node of the working LSP transmitting the packet) or receives a packet as an ingress node of the working LSP. The packet received from the upstream adjacent node includes a label which is an incoming label of the working LSP at the node.

When detecting its downlink adjacent node in the working LSP is unreachable, the node forms a duo-layer label in the packet, sets the inner layer label as an incoming label of the working LSP at an egress node of the BP-LSP (i.e., the MP), sets the outer layer label as an outgoing label of the BP-LSP at the node, and forwards the packet in the BP-LSP which delivers the packet to the egress node of the BP-LSP so that the egress node of the BP-LSP forwards the packet in the working LSP. In an example, for a packet received from the upstream adjacent node in the working LSP, the label in the packet may be replaced with the incoming label of the working LSP at the egress node of the BP-LSP (i.e., the MP) which serves as the inner layer label, and the outgoing label of the BP-LSP at the node is pushed into the packet serving as the outer layer label. As such, a duo-layer label is formed in the packet. For a packet received by the node as an ingress node of a working LSP, an incoming label of the working LSP at the egress node of the BP-LSP serving as an inner layer label and an outgoing label of the BP-LSP at the node serving as an outer layer label are pushed into the packet one after another to form a duo-layer label in the packet.

When detecting the downlink adjacent node of the node in the working LSP is reachable, the node may replace a label in the packet received from an upstream adjacent node in the working LSP with an outgoing label of the working LSP at the node and forward the packet in the working LSP; or the node serving as an ingress node of a working LSP merely push an outgoing label of the working LSP at the node into the packet and forward the packet in the working LSP. This procedure may adopt a conventional method.

In an example, the method may include the following procedures to inform the ingress node of the working LSP that the node has carried out protection switch under the wrapping FRR mode.

When detecting its downlink adjacent node in the working LSP is unreachable, the node initiates a notification of wrapping FRR mode FRR protection to the ingress node of the working LSP to make the ingress node re-calculate a path for the working LSP and tear down the working LSP and the WP-LSP after the re-calculation is finished.

In an example, a method for implementing MPLS TE FRR, which is applicable to an egress node of a BP-LSP (i.e., an RP), may include the following procedures.

The node receives a packet from the BP-LSP. The packet includes a duo-layer label in which an inner layer label is an incoming label of the working LSP at the node and an outer layer label is an incoming label of the BP-LSP at the node.

The node pops the outer layer label of the packet out to make the packet includes only one label, and forwards the packet in the working LSP by using the label in the packet. In an example, when the node is the egress node of the working LSP, the node may pop the only label of the packet out and forward the packet. For a packet which needs to be forwarded to a downstream adjacent node of the node in the working LSP (i.e., the node is an intermediate node of the working LSP), the node may replace the only label left in the packet with an outgoing label of the working LSP at the node, and forward the packet in the working LSP according to the label.

In an example, the method may also include the following procedures.

The node receives a packet from an upstream adjacent node in the working LSP. The packet includes a label which is an incoming label of the working LSP at the node.

The node may forward the packet in the working LSP according to a label in the packet. This procedure may adopt a conventional method. In an example, when the node is the egress node of the working LSP, the node may pop the label of the packet out and forward the packet. For a packet which needs to be forwarded to a downstream adjacent node of the node in the working LSP (i.e., the node is an intermediate node of the working LSP), the node may replace the label in the packet with an outgoing label of the working LSP at the node, and forward the packet in the working LSP according to the label.

Corresponding to the above method examples, various examples of the present disclosure also provide an apparatus for implementing MPLS TE FRR.

The apparatus may include the following components when serving as an intermediate node of a working LSP protected by a BP-LSP and being between an ingress node of the BP-LSP and an egress node of the BP-LSP (i.e., a PP).

A WP receiving module is to receive a packet from an upstream adjacent node in the working LSP. The packet includes a label which is an incoming label of the working LSP at the node.

A WP wrap-switching module is to replace the label in the packet with an outgoing label of a WP-LSP at the node when detecting its downlink adjacent node in the working LSP is unreachable (which means the node of the apparatus becomes a WP), and forward the packet in the WP-LSP so that the packet is forwarded through the WP-LSP to the ingress node of the BP-LSP (i.e., the RP) and then forwarded through the BP-LSP to the egress node of the BP-LSP (i.e., the MP) which forwards the packet to the working LSP.

The apparatus may also include a WP forwarding module to replace the label in the packet with an outgoing label of the working LSP at the node when detecting its downlink adjacent node in the working LSP is reachable, and forward the packet in the working LSP.

In an example, the apparatus may also include the following components.

A WP wrap-receiving module is to receive a packet from an upstream adjacent node in the WP-LSP (i.e., the packet is from a WP). The packet includes a label which is an incoming label of the WP-LSP at the node.

A WP wrap-forwarding module is to replace a label in the packet with an outgoing label of the WP-LSP at the node and forward the packet in the WP-LSP.

In an example, the apparatus may include the following components to inform the ingress node of the working LSP that the node of the apparatus has carried out protection switch under the wrapping FRR mode.

A WP wrap-notifying module is to initiate a notification of wrapping FRR mode protection to the ingress node of the working LSP when detecting its downlink adjacent node in the working LSP is unreachable (which means the node becomes a WP) to make the ingress node re-calculate a path for the working LSP and tear down the working LSP and the WP-LSP after the re-calculation is finished.

In an example, when the apparatus serves as an ingress node of a BP-LSP (i.e., an RP), the apparatus may include the following components.

An RP wrap-receiving module is to receive a packet from an upstream adjacent node in a WP-LSP (i.e., the packet is from a WP). The packet includes a label which is an incoming label of the WP-LSP at the node.

An RP bypass-switching module is to form a duo-layer label in the packet, set the inner layer label as an incoming label of the working LSP at an egress node of the BP-LSP (i.e., the MP), set the outer layer label as an outgoing label of the BP-LSP at the node, and forward the packet in the BP-LSP which delivers the packet to the egress node of the BP-LSP so that the egress node of the BP-LSP forwards the packet in the working LSP. In an example, a method of forming a duo-layer label in a packet may include: replacing the label in the packet with the incoming label of the working LSP at the egress node of the BP-LSP (i.e., the MP) which serves as the inner layer label, and pushing the outgoing label of the BP-LSP at the node of the apparatus into the packet as the outer layer label.

In an example, the apparatus may also include the following components.

A RP receiving module is to receive a packet from an upstream adjacent node in the working LSP (i.e., the node of the apparatus serves as an intermediate node of the working LSP transmitting the packet) or to receive\ a packet as an ingress node of the working LSP. The packet received from the upstream adjacent node includes a label which is an incoming label of the working LSP at the node.

An RP bypass-direct-switching module is to form a duo-layer label in the packet when detecting its downlink adjacent node in the working LSP is unreachable, set the inner layer label as an incoming label of the working LSP at an egress node of the BP-LSP (i.e., the MP), set the outer layer label as an outgoing label of the BP-LSP at the node of the apparatus, and forward the packet in the BP-LSP which delivers the packet to the egress node of the BP-LSP so that the egress node of the BP-LSP forwards the packet in the working LSP. In an example, for a packet received from the upstream adjacent node in the working LSP, the label in the packet may be replaced with the incoming label of the working LSP at the egress node of the BP-LSP (i.e., the MP) which serves as the inner layer label, and the outgoing label of the BP-LSP at the node is pushed into the packet serving as the outer layer label. As such, a duo-layer label is formed in the packet. For a packet received by the node as an ingress node of a working LSP, an incoming label of the working LSP at the egress node of the BP-LSP serving as an inner layer label and an outgoing label of the BP-LSP at the node serving as an outer layer label are pushed into the packet one after another to form a duo-layer label in the packet.

In an example, the apparatus may also include an RP forwarding module to replace a label in the packet received from an upstream adjacent node in the working LSP with an outgoing label of the working LSP at the node of the apparatus when detecting the downlink adjacent node of the node in the working LSP is reachable, and forward the packet in the working LSP; or push an outgoing label of the working LSP at the node into the packet when the node of the apparatus serves as an ingress node of a working LSP, forward the packet in the working LSP.

In an example, the apparatus may include the following components to inform the ingress node of the working LSP that the node of the apparatus has carried out protection switch under the wrapping FRR mode when the apparatus serves as an ingress node of a BP-LSP (i.e., an RP).

An RP switch-notifying module is to initiate a notification of wrapping FRR mode protection to the ingress node of the working LSP when detecting a downlink adjacent node in the working LSP is unreachable to make the ingress node re-calculate a path for the working LSP and tear down the working LSP and the WP-LSP after the re-calculation is finished.

In an example, when the apparatus serves as an egress node of a BP-LSP (i.e., an MP), the apparatus may include the following components.

An MP bypass-receiving module is to receive a packet from the BP-LSP. The packet includes a duo-layer label in which an inner layer label is an incoming label of the working LSP at the node and an outer layer label is an incoming label of the BP-LSP at the node.

An MP switching module is to pop the outer layer label of the packet out to make the packet includes only one label, and forward the packet in the working LSP by using the label in the packet. In an example, when the node of the apparatus is the egress node of the working LSP, the node may pop the only label of the packet out and forwards the packet according to FEC. For a packet which needs to be forwarded to a downstream adjacent node of the apparatus in the working LSP (i.e., the apparatus is an intermediate node of the working LSP), the apparatus may replace the only label in the packet with an outgoing label of the working LSP at the node of the apparatus, and forward the packet in the working LSP according to the outgoing label.

In an example, when the apparatus serves as an egress node of a BP-LSP (i.e., an MP), the apparatus may include the following components.

An MP receiving module is to receive a packet from an upstream adjacent node in the working LSP. The packet includes a label which is an incoming label of the working LSP at the node of the apparatus.

An MP forwarding module is to forward the packet according to the label in the packet. In an example, when the node of the apparatus is the egress node of the working LSP, the node may pop the label of the packet out and forward the packet according to FEC. For a packet which needs to be forwarded to a downstream adjacent node of the node in the working LSP (i.e., the node is an intermediate node of the working LSP), the node may replace the label in the packet with an outgoing label of the working LSP at the node, and forward the packet in the working LSP according to the label.

Since failures cannot be predicted when the network is constructed, i.e., each node may serve as an ingress node, an intermediate node and an egress node of different working LSPs and different BP-LSPs, a network is generally constructed by using identical node devices. Each node device may be equipped with the structures and functions of the above apparatuses so as to perform proper processing on different traffic flows. The above description takes processes performed by several roles that a node may take in different scenarios (e.g., the RP, PP, WP, MP, and BP) as an example to make the description simple and clear. But the roles are just differentiated with each other in a specific scenario. In practice, the nodes are identical with one another and have identical functions to act as different roles in processing different traffic flows.

Figure 9:
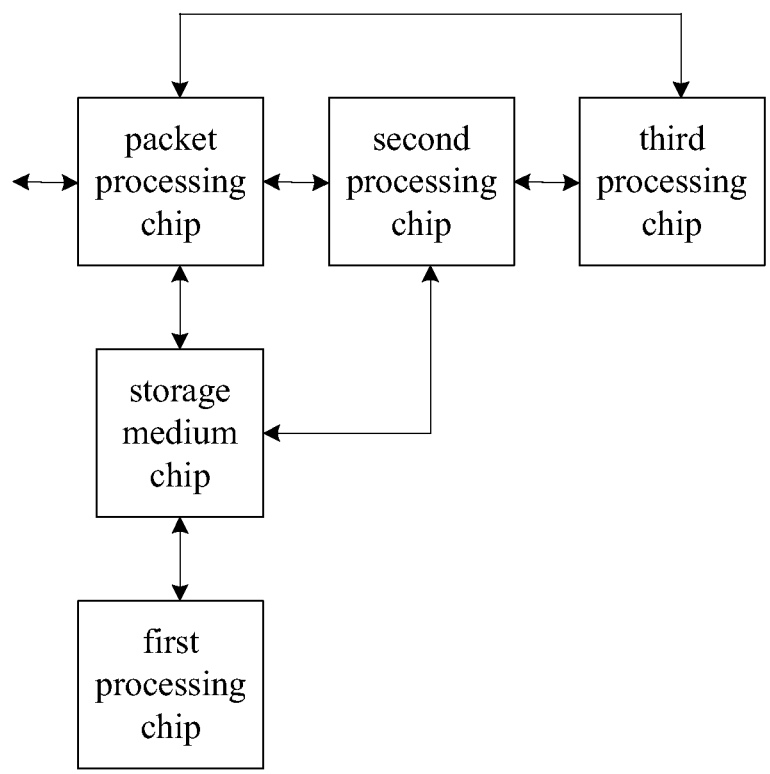
FIG. 9 is a schematic diagram illustrating a hardware structure adopted in an example of the present disclosure.

FIG. 9 is a schematic diagram illustrating a structure of an apparatus for implement MPLS TE FRR according to an example of the present disclosure. As shown in FIG. 9, the apparatus may include the following components.

A storage medium chip is to store all of forwarding entries configured in the node of the apparatus.

A first processing chip, which may be a central processing unit (CPU), an Application Specific Integrated Circuit (ASIC) or a Network Processor (NP), equipped with a hardware interface or a hardware interface and a driver software interface, is to generate all of the forwarding entries of the node.

A second processing chip, which may be a CPU, an ASIC or an NP, equipped with a hardware interface or a hardware interface and a driver software interface, is to detect a failure in a downlink adjacent node or a failure in a link linking the downlink adjacent node.

A third processing chip, which may be a CPU, an ASIC or an NP, equipped with a hardware interface or a hardware interface and a driver software interface with the second processing chip and the storage medium chip, is to enable or disable an outgoing label (oL) and a protection label (pL) according to whether the downlink adjacent node of the node of the apparatus in the working LSP is reachable, and transmit a notification of wrapping FRR protection.

A packet processing chip, which may be integrated with the storage medium chip or may be independent from the storage medium chip, having a hardware interface with the storage medium chip, the second processing chip and the third processing chip, is to forward packets by using the forwarding entries in the storage medium chip according to the above forwarding processes.

A processor in the apparatus may include at least one processor. The processor may include one or more of the processing chips shown in FIG. 9 and comprise a hardware processing circuit, such as CPU, ASIC, NP, etc. Machine readable instructions may be stored in the storage medium chip or other non-transitory computer readable medium to perform the functions described herein and/or the functions may be performed by dedicated hardware such as an ASIC or field programmable gate array (FPGA). Any of the nodes described above may include the components shown in FIG. 9.

Based on the above hardware structure, it is clear that how the procedures of the above methods and the modules of the above apparatuses are implemented by the hardware structure.

It should be understood that in the above processes and structures, not all of the procedures and modules are necessary. Certain procedures or modules may be omitted according to the needs. The order of the procedures is not fixed, and can be adjusted as needed. The modules are defined based on function simply for facilitating description. In an implementation, a module may be implemented by multiple modules, and functions of multiple modules may be implemented by the same module. The modules may reside in the same device or distribute in different devices. The "first", "second" in the above descriptions are merely for distinguishing two similar objects, and have no substantial meanings.

In various embodiments, a hardware module may be implemented mechanically or electronically. For example, a hardware module may comprise dedicated circuitry or logic that is permanently configured (e.g., as a special-purpose processor, such as an FPGA or an ASIC to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

A machine-readable storage medium, which may be non-transitory, is also provided, which is to store instructions to cause a machine to execute a control method as disclosed herein. Specifically, a system or apparatus having a storage medium which stores machine-readable program codes for implementing functions of any of the above examples and which may make the system or the apparatus (or CPU or MPU) read and execute the program codes stored in the storage medium. In this situation, the program codes read from the storage medium may implement any one of the above examples, thus the program codes and the storage medium storing the program codes are part of the technical scheme.

The storage medium for providing the program codes may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM and so on. Optionally, the program code may be downloaded from a server computer via a communication network.

The invention claimed is:

1. A method for implementing multi-protocol label switching traffic engineering (MPLS TE) fast reroute (FRR) in an MPLS TE network, the MPLS TE network including a bypass protection (BP)-label switching path (LSP) protecting a working LSP, the method comprising:
   receiving, at an at least one intermediate node of the working LSP, a packet including a label, wherein the label is an incoming label of the working LSP from an upstream adjacent node in the working LSP;
   replacing, at the at least one intermediate node, the label in the packet with an outgoing label of a wrapping protection (WP)-LSP when detecting a downlink adjacent node of the at least one intermediate node in the working LSP is unreachable, wherein the WP-LSP is in a reverse direction of the working LSP; and
   forwarding the packet with the outgoing label in the WP-LSP to an ingress node of the BP-LSP, wherein the ingress node of the BP-LSP forwards the packet via the BP-LSP to an egress node of the BP-LSP and the packet is forwarded from the BP-SLP to the working LSP.

2. The method of claim 1, wherein the at least one intermediate node comprises a plurality of intermediate nodes.

3. The method of claim 1, further comprising:
   initiating, by the at least one intermediate node, a notification of wrapping FRR mode protection to an ingress node of the working LSP when detecting the downlink adjacent node of the node in the working LSP is unreachable, wherein in response to the notification, the ingress node re-calculates a path for the working LSP and tears down the working LSP and the WP-LSP after the re-calculation is finished.

4. A method for implementing multi-protocol label switching traffic engineering (MPLS TE) fast reroute (FRR) in an MPLS TE network, the MPLS TE network including a bypass protection (BP)-label switching path (LSP) protecting a working LSP, the method comprising:
   receiving, at an ingress node of the BP-LSP, a packet including a label, wherein the label is an incoming label of the WP-LSP;
   forming, at the ingress node, a duo-layer label in the packet, wherein the duo-layer label includes an inner layer label set to be an incoming label of the working LSP at an egress node of the BP-LSP and an outer layer label set to be an outgoing label of the BP-LSP at the ingress node; and
   forwarding the packet in the BP-LSP, wherein the packet is delivered to the egress node via the BP-LSP and the packet is forwarded from the BP-SLP to the working LSP.

5. The method of claim 4, further comprising:
   receiving a second packet, wherein the second packet is from an upstream adjacent node in the working LSP or the second packet is an ingress node packet of the working LSP;
   replacing a label in the second packet with the incoming label of the working LSP at the egress node of the BP-LSP, wherein the incoming label is an inner layer label;
   pushing an outgoing label of the BP-LSP into the second packet as an outer layer label; and
   forwarding the second packet in the BP-LSP towards the egress node of the BP-LSP.

6. The method of claim 4, further comprising:
   initiating a notification of wrapping FRR mode protection to an ingress node of the working LSP when detecting a downlink adjacent node in the working LSP is unreachable, wherein the ingress node re-calculates a path for the working LSP and tears down the working LSP and a wrapping protection (WP)-LSP of the working LSP after the re-calculation is finished, wherein the WP-LSP is in a reverse direction of the working LSP.

7. A method for implementing multi-protocol label switching traffic engineering (MPLS TE) fast reroute (FRR) in an MPLS TE network, the MPLS TE network including a bypass protection (BP)-label switching path (LSP) protecting a working LSP, the method comprising:
   receiving, at an egress node of the BP-LSP, a packet from the BP-LSP, the packet including a duo-layer label, wherein the duo-layer label includes an inner layer label comprising an incoming label of the working LSP at the egress node and an outer layer label comprising an incoming label of the BP-LSP at the egress node;
   popping out the outer layer label of the packet at the egress node; and
   forwarding the packet in the working LSP according to the inner layer label of the packet.

8. An intermediate node to implement multi-protocol label switching traffic engineering (MPLS TE) fast reroute (FRR) in an MPLS TE network, the MPLS TE network including a bypass protection (BP)-label switching path (LSP) protecting a working LSP, the intermediate node comprising:
   a processor;
   a receiving module, executed by the processor, to receive a packet from an upstream adjacent node in the working LSP; wherein the packet includes a label comprising an incoming label of the working LSP; and
   a wrap-switching module, executed by the processor, to replace the label in the packet with an outgoing label of a wrapping protection (WP)-LSP when detecting a downlink adjacent node of the intermediate node in the working LSP is unreachable, and forward the packet in the WP-LSP, wherein the WP-LSP is in a reverse direction of the working LSP and the packet is delivered to an ingress node of the BP-LSP and is forwarded via the BP-LSP to the egress node of the BP-LSP and the packet is forwarded from the BP-SLP to the working LSP.

9. The intermediate node of claim 8, wherein a plurality of intermediate nodes, including the intermediate node, are included in the working LSP between the ingress node and the egress node of the BP-LSP, and each intermediate node comprises:
the receiving module and the wrap-switching module.

10. The intermediate node of claim 8, further comprising:
a switch notifying module to initiate a notification of wrapping FRR mode protection to an ingress node of the working LSP when detecting the downlink adjacent node is unreachable wherein the ingress node re-calculates a path for the working LSP and tears down the working LSP and the WP-LSP of the working LSP after the re-calculation is finished.

11. An ingress node to implement multi-protocol label switching traffic engineering (MPLS TE) fast reroute (FRR) in an MPLS TE network, the MPLS TE network including a bypass protection (BP)-label switching path (LSP) protecting a working LSP, the ingress node comprising:
a processor;
a wrap-receiving module, executed by the processor, to receive a packet including a label wherein the label comprises an incoming label of the WP-LSP from an upstream adjacent node in the WP-LSP;
a bypass-switching module, executed by the processor, to form a duo-layer label in the packet wherein the duo-label layer comprises an inner layer label set to be an incoming label of the working LSP at an egress node of the BP-LSP and an outer layer label set to be an outgoing label of the BP-LSP, and forward the packet in the BP-LSP wherein the packet is delivered to the egress node of the BP-LSP and the packet is forwarded from the BP-SLP to the working LSP.

12. The ingress node of claim 11, receiving a second packet and the ingress node further comprising:
a bypass-direct-switching module to replace a label in the second packet with an incoming label of the working LSP at the egress node of the BP-LSP, wherein the incoming label serves as an inner layer label, and push an outgoing label of the BP-LSP into the second packet as an outer layer label when detecting a downlink adjacent node is unreachable, and forward the second packet in the BP-LSP wherein the second packet is delivered to the egress node of the BP-LSP.

13. The apparatus of claim 11, further comprising:
a switch notifying module to initiate a notification of wrapping FRR mode protection to an ingress node of the working LSP when detecting a downlink adjacent node of the ingress node in the working LSP is unreachable wherein the ingress node re-calculates a path for the working LSP and tears down the working LSP and the WP-LSP of the working LSP after the re-calculation is finished.

* * * * *